US 8,016,200 B2

(12) United States Patent
Gong et al.

(10) Patent No.: US 8,016,200 B2
(45) Date of Patent: Sep. 13, 2011

(54) HANDLE AND ACTIVATION ASSEMBLY FOR PORTABLE ELECTRONIC DEVICE

(75) Inventors: Frank Gong, Syosset, NY (US); Chad Chaumont, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 45 days.

(21) Appl. No.: 12/550,933

(22) Filed: Aug. 31, 2009

(65) Prior Publication Data

US 2011/0049243 A1    Mar. 3, 2011

(51) Int. Cl.
*G06K 7/10* (2006.01)

(52) U.S. Cl. ............... 235/462.47; 235/462.48

(58) Field of Classification Search ............ 235/462.48, 235/462.47, 462, 472
See application file for complete search history.

(56) References Cited

U.S. PATENT DOCUMENTS

| | | | | |
|---|---|---|---|---|
| 5,736,726 A * | 4/1998 | VanHorn et al. | ......... | 235/472.02 |
| 5,969,321 A * | 10/1999 | Danielson et al. | ....... | 235/462.01 |
| 5,996,896 A * | 12/1999 | Grabon | ................... | 235/472.02 |
| 6,327,493 B1 * | 12/2001 | Ozawa et al. | .................. | 600/476 |
| 6,357,662 B1 * | 3/2002 | Helton et al. | ............. | 235/462.45 |
| 6,899,273 B2 * | 5/2005 | Hussey et al. | ............. | 235/462.48 |
| 7,353,051 B2 * | 4/2008 | Wulff | ........................ | 455/575.4 |

* cited by examiner

*Primary Examiner* — Daniel Hess
*Assistant Examiner* — Tabitha Chedekel

(57) ABSTRACT

A scanning assembly is disclosed. The scanning assembly comprises a mobile electronic device comprising an optical sensor, the mobile electronic device adapted to perform a scanning operation, and a trigger assembly. The trigger assembly comprises a handle member adapted to be releasably coupled to the mobile electronic device, the handle member comprising a light source, and a switch assembly adapted to receive input from an operator of the trigger assembly, wherein the light source is adapted to emit a light signal in response to manipulation of the switch assembly, and wherein the mobile electronic device is adapted to perform the scanning operation in response to receiving the light signal with the optical sensor.

23 Claims, 3 Drawing Sheets

HANDLE AND ACTIVATION ASSEMBLY FOR PORTABLE ELECTRONIC DEVICE

TECHNICAL FIELD

Embodiments of the subject matter described herein relate generally to portable electronic devices and associated handle attachments. More particularly, embodiments of the subject matter relate to a triggering mechanism for such a combined portable device and handle attachment.

BACKGROUND

Portable electronic devices, such as mobile computing units, can be used to perform various operations that require movement between locations. For example, where merchandise or cargo—or other aggregations of transportable goods—are distributed throughout an area, whether in a retail environment or a warehouse, it can be useful to use a portable electronic device to record or discover the location of the goods. Thus, an operator can move among the goods and operate the portable electronic device to perform such operations.

A portable electronic device can be capable of discovering information regarding objects, including recording their location. Such information collection and recordation can be accomplished by a variety of operations. For example, a mobile RFID reader can perform RFID interrogation and record RFID response signals. As another example, a bar code scanner can be used to record a bar code for each object, such as during inventory operations.

To assist a user in comfortably manipulating a multi-function electronic device in performing such operations, a device or component can be coupled to the portable electronic device for easier use. In one example, a handle with a trigger can be coupled to a mobile computing device. The trigger can operate the mobile computing device to perform certain, such as RFID interrogation or bar code scanning, among others.

Handles commonly used in such applications typically have one or more features selected for use in an active environment. For example, the combined handle and mobile computing device is typically robust enough to survive a fall after an accidental drop by a user. One such feature is a magnetic switch activated by the trigger of the handle. In such a device, a magnet in the handle may be moved near the mobile computing device, which can have an activating device. When the magnet is sufficiently close to the activating device for its magnetic field to act in sufficient strength on the activating device, the activating device can be triggered. The magnetic switch, however, has certain disadvantages such as a lack of tactile feedback to the user in response to triggering.

Moreover, magnetic triggers are susceptible to various disadvantages inherent to producing a binary effect—the triggering or not triggering of the device by the user—with an analog device. For example, the magnetic strength of the magnet can vary between different magnetic switches, causing either false "fires" when a trigger is not activated, but the magnet approaches sufficiently close to the activating device for it to activate. Conversely, a weak magnet might be moved by mechanical manipulation of the operator into the correct position in proximity to the activating device, but the weaker field of the magnet may be insufficient to cause the activating device to activate.

Magnetic switches are sometimes used because they do not require a physical connection between the handle and mobile computing device beyond a mechanical coupling. Those handles and triggering assemblies which have such physical connections, such as electrical connections, can be susceptible to fluids, such as water, or dust particles or other contaminants entering the connecting apparatuses, or remaining thereon, or otherwise impairing the connection.

BRIEF SUMMARY

A scanning assembly is disclosed. The scanning assembly comprises a mobile electronic device comprising an optical sensor, the mobile electronic device adapted to perform a scanning operation, and a trigger assembly. The trigger assembly comprises a handle member adapted to be releasably coupled to the mobile electronic device, the handle member comprising a light source, and a switch assembly adapted to receive input from an operator of the trigger assembly, wherein the light source is adapted to emit a light signal in response to manipulation of the switch assembly, and wherein the mobile electronic device is adapted to perform the scanning operation in response to receiving the light signal with the optical sensor.

A mobile electronic assembly is also disclosed. The mobile electronic assembly comprises a mobile electronic device having an optical sensor, and a triggering assembly adapted to be releasably coupled to the mobile electronic device. The triggering assembly comprises a triggering device adapted to be manipulated by a user of the mobile electronic assembly, the triggering device comprising a finger trigger, and an optical emitter adapted to transmit an optical signal in response to manipulation of the triggering device by the user, the optical emitter oriented to direct the optical signal toward the optical sensor.

Another scanning assembly is disclosed. The scanning assembly comprises a portable electronic device comprising an optical scanner and an optical sensor, and a handle assembly adapted to be releasably coupled to the portable electronic device. The handle assembly comprises a trigger assembly adapted to be manipulated by a user of the scanning assembly, and a light source adapted to emit light in response to manipulation by the user, wherein the handle assembly is adapted to be releasably coupled to the portable electronic device such that the light source is directed to emit light toward the optical sensor, and the portable electronic device is adapted to operate the optical scanner in response to detecting light from the light source.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
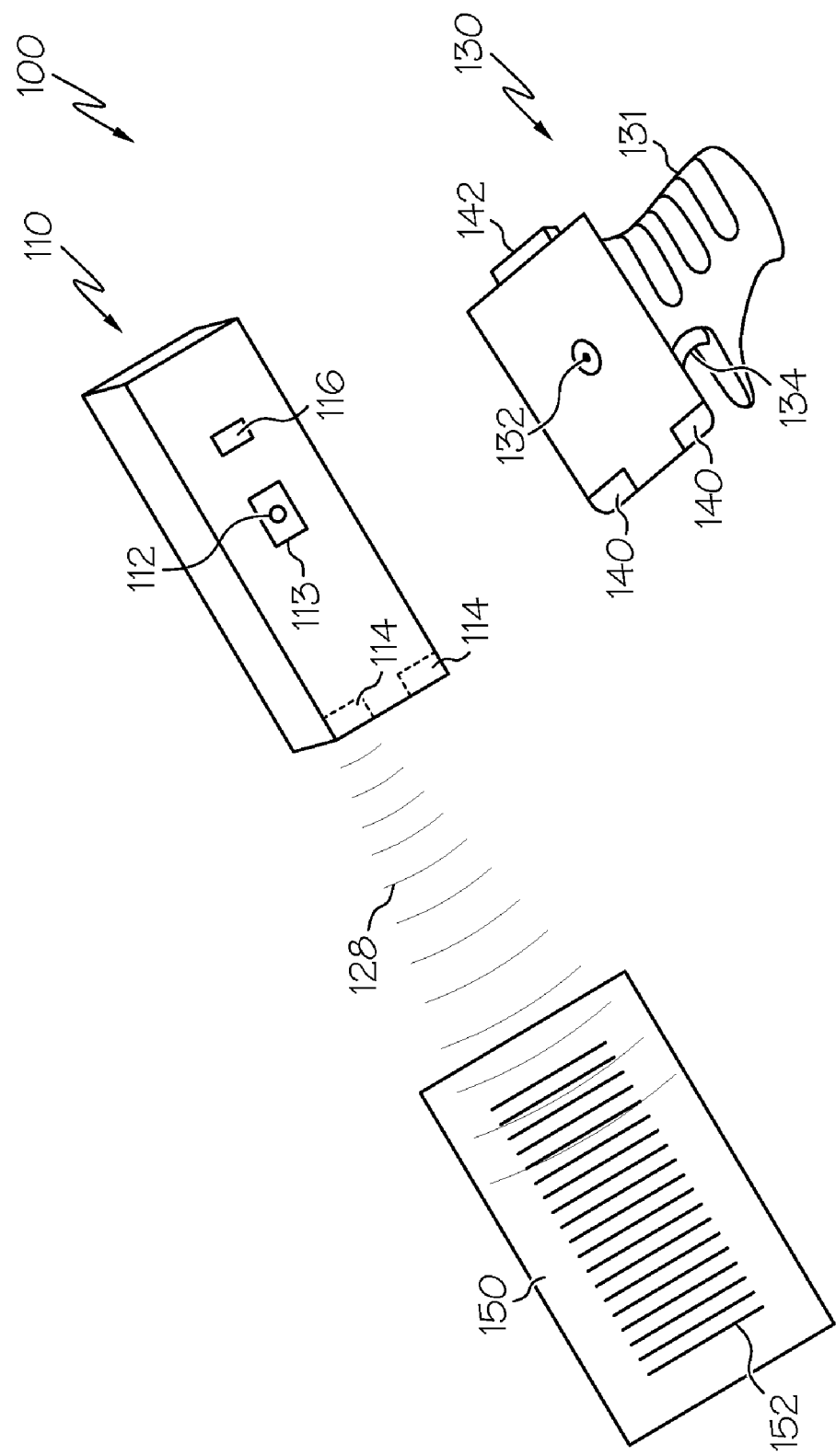
FIG. 1 is an exploded perspective view of an embodiment of a portable electronic device and handle assembly.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

FIG. 1 illustrates a disassembled embodiment of a scanning system 100. The scanning system 100 can comprise a mobile computing device 110, a handle assembly 130, and a scan target 150. The mobile computing device 110 can have at least one optical sensor 112, as well as one or more front coupling sites 114 and one or more rear coupling sites 116. The handle assembly 130 can comprise an optical emitter 132, as well as one or more front coupling hooks 140 and at least one rear coupling latch 142. A actuator 134 can also be coupled to the optical emitter 132, as described in greater detail below. The scan target 150 can have a scan area 152. A user can manipulate the actuator 134 to cause the optical emitter 132 to emit a signal. The signal can be detected by the optical sensor 112, which can, in turn, cause the mobile computing device 110 to emit a scan signal 128. The scan signal 128 can impinge on the scan area 152 to perform a scan operation for the mobile computing device 110.

Figure 2:
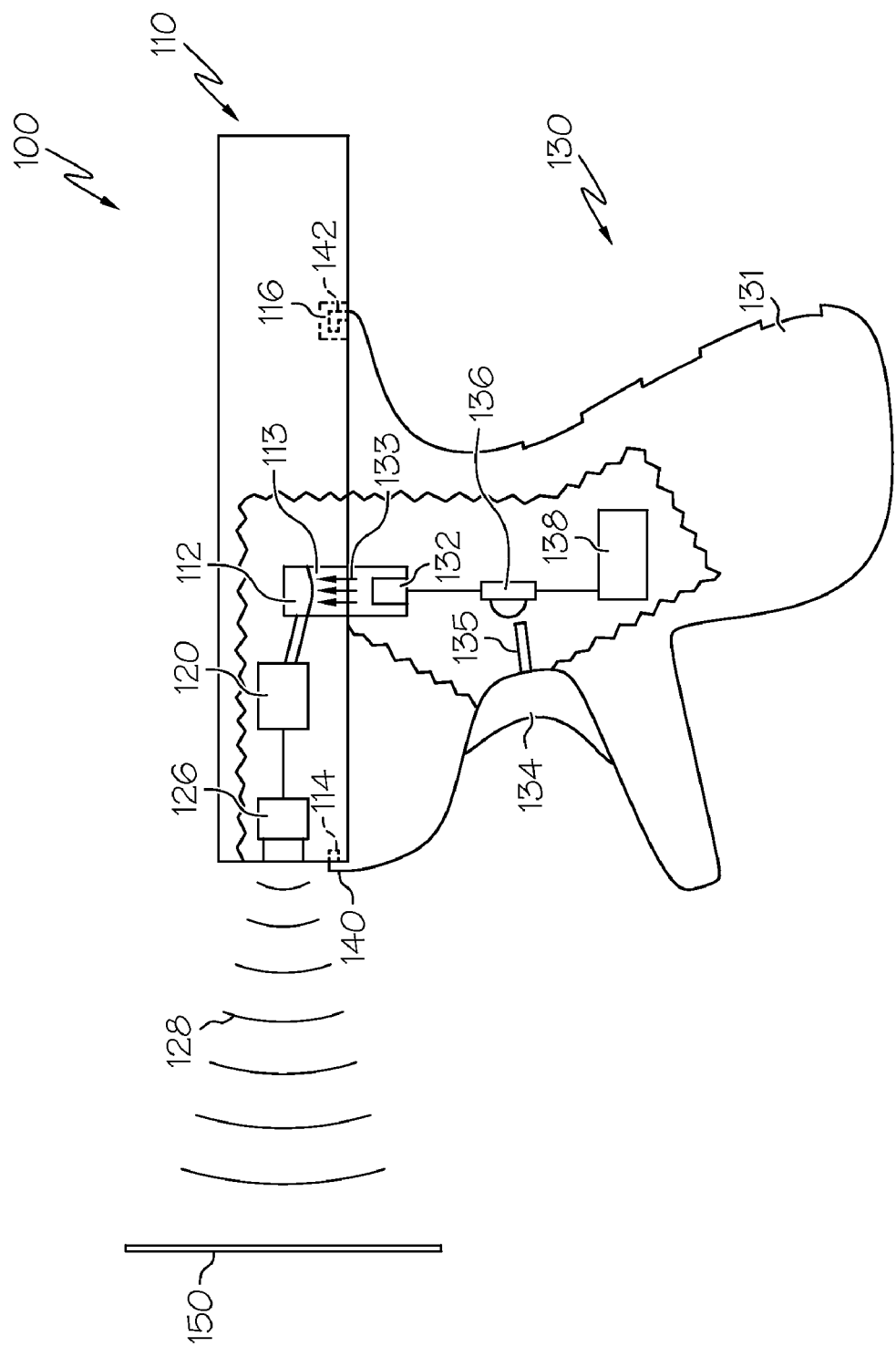
FIG. 2 is a side view of the assembled embodiment of FIG. 1.

Description is continued with additional reference to the assembled side view of the scanning system 100 in FIG. 2. The mobile computing device 110, as described herein, can be a portable computing device, such as a RFID reader, personal digital assistant, or other similar device. Other embodiments can use other portable electronic devices, however, including those which do not have independent computing or processing capabilities. As described herein, the mobile computing device 110 is a portable computing unit capable of scanning bar codes. Other electronic devices capable or performing operations in response to an optical signal from a handle assembly coupled to the electronic device can be used, without limit. Some examples include a personal digital assistant, a portable RFID reader, or other mobile computing device, among others.

The mobile computing device 110 can comprise an optical sensor 112, front and rear coupling sites, 114, 116, a processing unit 120, and a scanning module 126. The mobile computing device 110 can have other components and systems, such as input and output devices, such as a keypad, display, wireless antenna, as well as other computing components such as memory devices, data storage devices, and so on. The mobile computing device 110 is described as performing certain operations and/or having certain features. Nonetheless, other features and operations can be present or performed by an electronic device without deviating from the scope of the improvements described herein.

The mobile computing device 110 can have front and rear coupling sites 114, 116, which can be embodied as grooves or recesses adapted to releasably couple with the handle assembly 130. In the illustrated embodiment, the front coupling sites 114 are two front-facing recesses adapted to receive the front coupling hooks 140. Similarly, the rear coupling site 116 is a recess, which can optionally have a notch or flange, which is adapted to receive the rear coupling latch 142. The front and rear coupling sites 114, 116 can vary greatly between embodiments. In certain embodiments where the handle assembly 130 can be releasably coupled to the mobile computing device 110 without the need for them, the coupling sites can be omitted altogether. The exact type and position of coupling site can vary between embodiments, so long as the mobile computing device 110 and handle assembly 130 can be releasably coupled to each other. Such releasable coupling can be accomplished through any appropriate technique, such as interference fitting, locking or latching mechanisms or devices, retention flanges, and so on.

The mobile computing device 110 preferably includes an optical sensor 112. In certain embodiments, the optical sensor 112 can be coupled to the processing unit 120. The optical sensor 112 can be positioned within a recess 113 of the mobile computing device 110, or flush with a surface of it. The optical sensor 112 can receive power from a power device of the mobile computing device 110, such as a rechargeable power unit. The optical sensor 112 can be operated by the processing unit 120.

The optical sensor 112 is preferably adapted to detect optical signals. For example, the optical sensor 112 can be adapted to detect visible light, infrared light, ultraviolet light, and so on. The optical sensor 112 can have additional functionality, such as operating as a camera. The type of optical sensor can vary between embodiments. The optical sensor 112 can provide a signal to the processing unit 120 in response to detecting an optical signal, such as a flash of light. In certain embodiments, the optical sensor 112 can provide a signal in response to detection of any appropriate optical signal. In some embodiments, the optical sensor 112 can have additional functional capability to transmit a signal to the processing unit 120 only when a particular pattern or sequence of optical signals is detected, as described in greater detail below.

The processing unit 120 can be coupled to the optical sensor 112 as well as the scanning module 126. While the processing unit 120 is preferably adapted and configured to receive a signal from the optical sensor 112 and operate the scanning module 126 in response, the type of processing unit 120 can vary between embodiments. Thus, no particular processor is preferred for an embodiment except that it performs the described features. Accordingly, the processing unit 120 can be a single device or component, or can include additional components as an integrated device. In certain embodiments, the processing unit 120 can be adapted and/or configured to detect a particular pattern of signals, including the wavelength of light, as well as a sequence and/or frequency of optical signals, as desired for the embodiment.

In the illustrated embodiment, the scanning module 126 is described a bar code scanning device. In other embodiments, the scanning module 126 could be a camera, an RFID antenna or transceiver, an optical scanner, such as a laser device, and so on. In certain embodiments, the scanning module 126 can perform non-scanning features, such as projecting an image as well or instead of scanning. The scanning module 126 can preferably be operated by the processing unit 120, and can both receive commands from the processing unit 120, as well as provide information obtained from scanning to it.

For descriptive purpose, the processing unit 120 is shown emitting a scan signal 128. The scan signal 128 can be a laser beam, whether single or multiple, stationary or scanning, an infrared beam, or other signal type appropriate to the embodiment. Similarly, while the scan target 150 is illustrated as having a scan area 152 for descriptive purposes with a bar code scanner, the scan target 150 can be different objects in different embodiments, such as an RFID tag, as appropriate to the embodiment.

The handle member or handle assembly 130 preferably has a grip portion 131 and an actuator 134. The handle assembly 130 can include an optical emitter 132, an actuator 134, an extension portion 135, a switch 136, and a power source 138, among other components. The handle assembly 130 can also be referred to as a trigger assembly because of its function of providing triggering signals to the mobile computing device. Additionally, in some embodiments, the actuator 134, extension portion 135 (when present), and switch 136 can be referred to as a trigger assembly. This is because the triggering operation can be used to describe the activation of the optical emitter 132 as well as activation of the mobile computing device 110 in response to the optical signal 133. Finally, in certain embodiments of the handle assembly 130, the actuator 134 can be embodied as a physical trigger. The grip portion 131 is preferably comfortable for the user of the scanning system 100 to hold when operating it. The grip portion 131 can have grooves and other surface features to aid grasping it.

The actuator 134 is preferably situated to be manipulated by the user while holding the handle assembly. For purposes of description, the actuator 134 is positioned to be squeezed by the index finger of the user. In other embodiments, it can be a button or post which can be manipulated by the user while comfortably grasping the handle assembly 130. Thus, while manipulation is used to describe the activation of the actuator 134, in other embodiments, it can be include pulling, squeezing, rubbing, or otherwise exerting a manual force to activate the appropriate device.

The actuator 134 can have an extension portion if necessary to operate the switch 136. Thus, for the illustrated embodiment, where a dome switch is used, the extension portion 135 provides for physical contact with the switch 136. In certain embodiments, the extension portion 135 can be omitted. In other embodiments, the extension portion 135 can have a different shape and/or relative size to accomplish the desired feature of assisting user in activating the switch 136 with the actuator 134.

The switch 136 can be, as mentioned, a dome switch. In other embodiments, it can be a literal switch, including various types of microswitches, a momentary switch, and so on. Preferably the switch 136 can provide power from the power source 138 to the optical emitter 132 when the actuator 134 is manipulated by the user. The switch 136 can cooperate with the extension portion 135, as described above, in certain embodiments. In certain embodiments, the actuator 134 and switch 136, with or without the extension portion 135 can be collectively considered as a switch assembly.

The switch 136 can include types of switches which provide feedback, including tactile feedback, when activated. Thus, when activated by pressure from the actuator 134, the switch 136 can click or trip in a way that is detectable to a user manipulating the actuator 134, including manipulation via the extension portion 135. In addition to tactile feedback, the switch 136 can provide audible feedback, such as a sound or signal that the switch 136 has been activated. Both types of feedback can be advantages over non-contact switches, such as magnetic switches.

Additionally, because the moving parts of the handle assembly 130 are simple and directly connected, they can be housed, mounted, and coupled in a rugged housing. Accordingly, the handle assembly 130 can be adapted to survive normal usage events, including falls from a height of normal operation by a user. A magnetic switch, by contrast, can experience difficulty operating after such events because the magnetic component relies upon relatively precise positioning and actuation for operations.

Different mechanical and electrical triggering devices known in the art can require a physical connection to the electronic component being triggered. Such a physical connection could be an electrical connection, port, or mechanical interaction, and so on. Events that can occur during normal operations, such as accidental drops, can cause damage to the constituent components of physical connections, such as a port, plug, and the like. While the front coupling hooks 140 and rear coupling latch 142 are coupling components to join the mobile computing device 110 and handle assembly 130 together, they are not required for triggering operations. The handle assembly 130 advantageously utilizes an optical signal for triggering operations without a required physical connection for triggering. Therefore, unlike triggering devices which require a physical connection, the handle assembly 130 can withstand events, including wear and tear, which could disable a mechanical and/or electrical triggering device.

The power source 138 is preferably coupled to the grip portion 131 of the handle assembly 130. In certain embodiments, the power source 138 can be disposed within the handle assembly 130, such as in a compartment or held in place with interference members, fasteners, flanges, or through any other appropriate technique. In certain embodiments, the power source 138 can be removable from the handle assembly 130. Thus, the power source 138 preferably can be removed when depleted, and replaced with one of a similar type to permit continued or renewed operation of the handle assembly 130. In certain embodiments, a rechargeable power source 138 can be used. In such embodiments, external contacts can be present on the surface of the handle assembly 130. Such external contacts can be coupled to the power source 138 to provide a recharging connection.

The power source 138 can supply any type of power appropriate for the embodiment. For example in those embodiments where electrical power is used by the optical emitter 132, the power source 138 can supply electrical power of the appropriate voltage and amperage. The power source 138 can be a chemical battery, such as a lead-acid, nickel-hydride, lithium-ion, or other desired type. The power source 138 can alternatively be a fuel cell, capacitor, or any other type of device appropriate for supplying power in the particular embodiment.

In certain embodiments, the power source 138 can have a connection in the handle assembly 130 which can be coupled to the mobile computing device 110, or other electronic component, to receive power from the mobile computing device 110. Such a connection can be of any appropriate type, including metal contacts, a plug, port, and so on. The connection can be a primary or secondary source of recharging power for the power source 138. Accordingly, even in those embodiments of the handle assembly 130 which have such a connection, the power source 130 can receive power to recharge it from another source as well.

The optical emitter 132 can be any type of emitter of electromagnetic radiation desired for the embodiment. Thus, the optical emitter 132 can emit any desired type of optical signal, including visible light, infrared light, ultraviolet light, and so on. In certain embodiments, the optical emitter 132 can be a light-emitting diode. In other embodiments, the optical emitter 132 can be different emitting devices, such as an incandescent light source, a fluorescent light source, and so on. The physical structure of the optical emitter can vary between embodiments, so long as it performs the desired operations. The optical emitter 132 can be flush with a surface of the handle assembly 130, or it can be positioned within a recess of the handle assembly 130. Preferably, however, the optical emitter 132 is positioned and adapted to transmit an optical signal 133 toward or in the direction of the optical sensor 112 when the handle assembly 130 is coupled to the mobile computing device 110.

The optical emitter 132 can be a simple device which emits an optical signal, such as optical signal 133, when supplied power from the power source 138 by the switch 136. In other embodiments, the optical emitter 132 can perform more complex functions, such as emitting a pattern of optical signals in response to a signal from the switch 136. For example, the optical emitter 132 can be adapted to produce a pattern of optical signals including a repeated flash of light, a sequence of light flashes of varying frequency and/or duration, a succession of optical flashes of different wavelengths of the visible spectrum, as well as non-visible light. For example, one embodiment of an optical emitter 132 can be adapted to transmit a short-duration flash of visible light, followed by a long-duration flash of infrared light, followed by another short-duration flash of visible light. Other permutations and combinations can be performed as well, as desired. In such embodiments, the optical emitter 132 can optionally cooperate with one or more processing devices, if desired. Additionally, in certain embodiments, the optical emitter 132 can have an integrated processing device or logic circuit for producing the desired pattern.

In those embodiments wherein the optical emitter 132 is configured or adapted to produce a certain pattern, the optical sensor 112 can be configured or adapted to provide a signal to the processing unit 120 only upon detection of the certain pattern, rather than simply any optical signal. In such embodiments, the optical sensor 112 can cooperate with one or more processing devices, memory devices, and/or logic circuits to perform the necessary operations. Such components can be separate units or integrated with the optical sensor. In other embodiments, the optical sensor 112 can function by providing a signal to the processing unit identifying that an optical signal was received including, in some embodiments, characteristics regarding the type of optical signal, such as the type of signal received (i.e. infrared light, visible light, etc.) and/or duration of the signal. In such embodiments, detection of the appropriate pattern can be performed by the processing unit 120 in response to the information about received optical signals provided by the optical sensor 112. In certain embodiments, each of the optical emitter 132 and optical sensor 112 can be configured to adjust the type of optical signal produced and detected, respectively.

The optical emitter 132 can be disposed on a surface of the handle assembly 130, or positioned within a recess. The optical emitter 132 can have one or more sealing members near, around, or over it, for purpose of inhibiting contaminants, such as dust, from impairing operation of the optical emitter 132. Such a seal is preferably impermeable to fluids, such as air or water, as well as physical particles.

Figure 3:
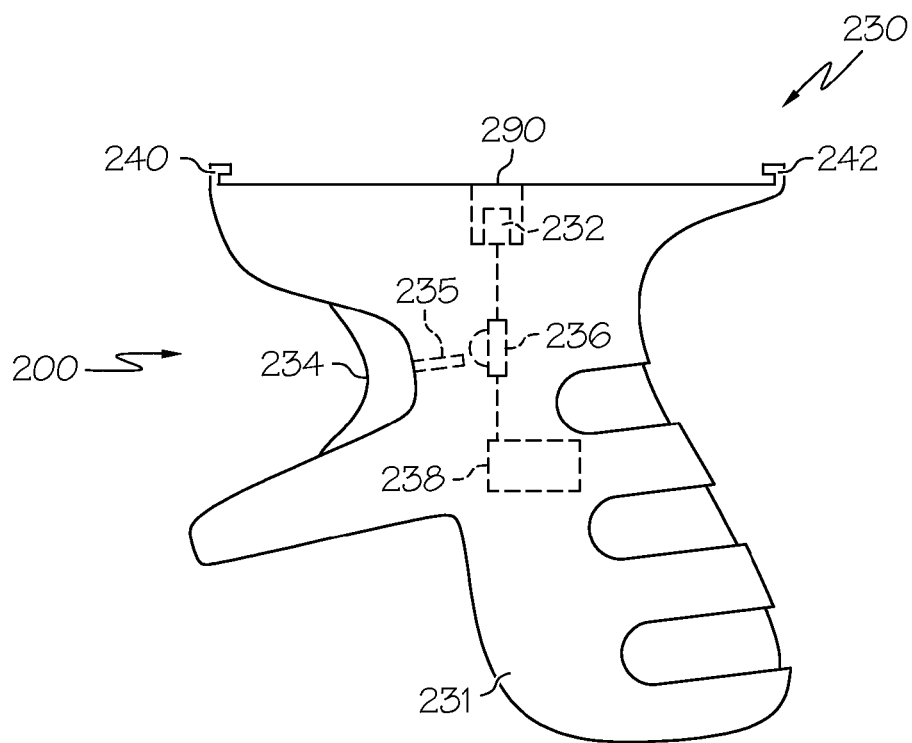
FIG. 3 is a side view of another embodiment of a handle assembly.
Figure 4:
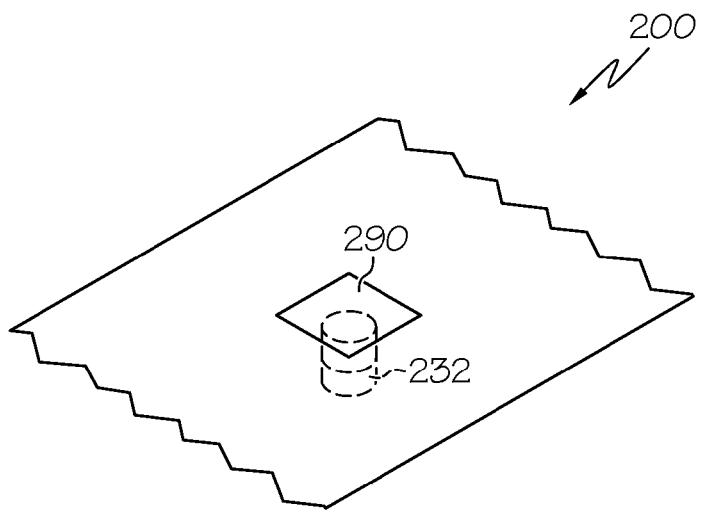
FIG. 4 is a detailed perspective view of a portion of the handle assembly embodiment of FIG. 3.

With reference to FIGS. 3 and 4, in certain embodiments, a seal 290 is shown. FIG. 3 illustrates a side view of the handle assembly 230, while FIG. 4 illustrates a detailed perspective view of a portion of the handle assembly 230 including the optical emitter 232 and seal 290. Unless otherwise specified, the components of FIGS. 3 and 4 are substantially similar to those of FIGS. 1 and 2, except that the numerical indicators have been incremented by 100.

In the illustrated embodiment, the optical emitter 232 is positioned in a recess in the handle assembly 230. The optical emitter 232 can, in certain embodiments, be positioned flush, or substantially flush, with a surface of the handle assembly 230 as well, without deviating from the features described. The seal 290 is preferably disposed across at least a portion of the optical emitter 232. As shown, the seal 290 can be disposed entirely across the optical emitter 232, sealing the recess. The seal 290 can be transparent, wherein optical signals from the optical emitter 232 can pass through the seal 290 substantially unimpeded. As one example, a transparent glass or plastic seal can be used to protect the optical emitter 232 while still permitting optical signals to pass through the seal 290. In certain embodiments, the seal 290 can be opaque, wherein optical signals from the optical emitter 232 are inhibited from passing through the seal 290. In such embodiments, the seal 290 can be removed from the path of travel of optical signals between the optical emitter 232 and an optical sensor, so as to permit operation. Removal can be accomplished by the user prior to operating the combined scanning assembly.

In certain embodiments, the seal 290 can be moveable. Thus, the seal 290 can occupy a first position, such as the illustrated position wherein the optical emitter 232 is behind the seal 290. The seal 290 can be moveable to a second, withdrawn position, wherein the seal 290 is removed, and the optical emitter 232 is exposed. For example, a switch or slide can be present on the handle assembly 230 to operate the position of the seal 290. In certain embodiments, the seal 290 can be biased toward the closed, illustrated position by a resilient member, such as a spring. A mechanical function can withdraw the seal 290 during coupling of the handle assembly 230 to the mobile computing device 210, such as the insertion of a protrusion (not shown) of the mobile computing device 210 into a recess (not shown) of the handle assembly 230. The act of coupling the components can operatively move the seal 290 to the second, withdrawn, and open position, thereby exposing the optical emitter 232. In those embodiments where the seal 290 is substantially transparent to optical signals produced by the optical emitter 232, such features can be omitted.

With reference again to FIGS. 1 and 2, in certain embodiments, a baffles (not shown) can be present surrounding the optical emitter 132. The baffles can, when the handle assembly 130 and mobile computing device 110 are coupled together, extend towards the optical sensor 112. Preferably, the baffles is adapted to inhibit stray light from entering the optical sensor 112. For example, in those embodiments where the optical sensor 112 is positioned within a recess of the mobile computing device 110, a baffles can extend upwards from the handle assembly 130. In such embodiments, when the handle assembly 130 and mobile computing device 110 are coupled together, the baffles can extend into the recess in which the optical sensor 112 is positioned, preferably along the periphery of the optical sensor 112. Thus, the baffles can enclose a space, such as a hollow cylindrical central portion, wherein the optical signal 133 produced the optical emitter 132 can travel to the optical sensor 112 without stray light interfering, reducing the occurrence of false positive detections by the optical sensor 112.

During operation, the user preferably couples the handle assembly 130 to the mobile computing device 110. The coupling can be accomplished by interaction of the front and rear coupling sites 114, 116 with the front coupling hooks 140 and rear coupling latch 142. The user can then grasp the handle assembly 130 and direct the end of the mobile computing device 110 housing the scanning module 126 toward the scan target 150. The user can manipulate the actuator 134 to activate the switch 136. By activating the switch 136, the user can supply power from the power source 138 to the optical emitter 132. The optical emitter 132 can produce an optical signal 133, which can be detected by the optical sensor 112. The optical sensor 112 can detect the optical signal 133 and provide a signal to the processing unit 120. The processing unit 120 can operate the scanning module 126 to produce a scan signal 128 in response to detecting the optical signal 133.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A scanning assembly comprising:
   a mobile electronic device comprising an optical sensor, the mobile electronic device adapted to perform a scanning operation; and
   a trigger assembly comprising:
      a handle member adapted to be releasably coupled to the mobile electronic device;
      a light source positioned in the handle member; and
      a switch assembly adapted to receive input from an operator of the trigger assembly, wherein the light source is adapted to emit a light signal in response to manipulation of the switch assembly, and wherein the mobile electronic device is adapted to perform the scanning operation in response to receiving the light signal with the optical sensor.

2. The scanning assembly of claim 1, wherein the light source comprises a light-emitting diode.

3. The scanning assembly of claim 1, wherein the light source is adapted to emit light signals in the visible spectrum.

4. The scanning assembly of claim 1, wherein the handle member further comprises a power source coupled to the light source, and the switch assembly is adapted to selectively provide power from the power source to the light source.

5. The scanning assembly of claim 4, wherein the power source is removable from the handle member.

6. The scanning assembly of claim 4, wherein the switch assembly comprises:
   an actuator adapted to be manipulated by a user; and
   a switch adapted to provide power from the power source to the light source in response to manipulation of the actuator.

7. The scanning assembly of claim 1, further comprising a seal disposed across the light source.

8. The scanning assembly of claim 7, wherein the seal is adapted to permit the light signal to pass therethrough.

9. The scanning assembly of claim 7, wherein the seal is impermeable to fluids.

10. The scanning assembly comprising of claim 1, wherein the light source is disposed on a surface of the handle member or positioned within a recess of the handle member.

11. A mobile electronic assembly comprising:
    a mobile electronic device having an optical sensor; and
    a triggering assembly comprising a handle member adapted to be releasably coupled to the mobile electronic device, the triggering assembly further comprising:
       a triggering device adapted to be manipulated by a user of the mobile electronic assembly, the triggering device comprising a finger trigger; and
       an optical emitter positioned in the handle member, adapted to transmit an optical signal in response to manipulation of the triggering device by the user, the optical emitter oriented to direct the optical signal toward the optical sensor.

12. The mobile electronic assembly of claim 11, wherein the mobile electronic device is adapted to detect the optical signal with the optical sensor and perform a function in response to detecting the optical signal.

13. The mobile electronic assembly of claim 11, wherein the triggering assembly further comprises a handle portion adapted to be held by the user of the mobile electronic device assembly, the handle portion adapted to receive a finger of the user adjacent the triggering device.

14. The mobile electronic assembly of claim 11, wherein the optical emitter is adapted to transmit optical signals that comprise a pattern of visible light.

15. The mobile electronic assembly of claim 11, wherein the optical emitter is adapted to transmit optical signals that comprise a flash of light.

16. The mobile electronic assembly of claim 11, wherein the optical emitter comprises a light-emitting diode adapted to emit visible light.

17. The mobile electronic assembly of claim 11, wherein the optical emitter is disposed on a surface of the handle member or positioned within a recess of the handle member.

18. A scanning assembly comprising:
- a portable electronic device comprising an optical scanner and an optical sensor; and
- a handle assembly adapted to be releasably coupled to the portable electronic device, the handle assembly comprising:
  - a trigger assembly adapted to be manipulated by a user of the scanning assembly;
  - a light source adapted to emit light in response to manipulation by the user, wherein the handle assembly is adapted to be releasably coupled to the portable electronic device such that the light source is directed to emit light toward the optical sensor, and the portable electronic device is adapted to operate the optical scanner in response to detecting light from the light source.

19. The scanning assembly of claim 18, wherein the optical scanner comprises a bar code scanner.

20. The scanning assembly of claim 18, wherein:
- the light source is adapted to transmit visible light, infrared light, and/or ultraviolet light; and
- the optical sensor is adapted to detect visible light, infrared light, and/or ultraviolet light.

21. The scanning assembly of claim 18, wherein the handle assembly further comprises a baffles surrounding the light source, the baffles adapted to inhibit light from entering the optical sensor except from the light source when the handle assembly is coupled to the portable electronic device.

22. The scanning assembly of claim 18, wherein the trigger assembly is adapted to provide tactile feedback to the user in response to manipulation of the trigger assembly.

23. The scanning assembly of claim 18, wherein the light source is disposed on a surface of the handle assembly or positioned within a recess of the handle assembly.

\* \* \* \* \*

UNITED STATES PATENT AND TRADEMARK OFFICE
CERTIFICATE OF CORRECTION

PATENT NO.         : 8,016,200 B2                                     Page 1 of 1
APPLICATION NO.    : 12/550933
DATED              : September 13, 2011
INVENTOR(S)        : Gong et al.

It is certified that error appears in the above-identified patent and that said Letters Patent is hereby corrected as shown below:

In Column 10, Line 34, in Claim 10, delete "assembly comprising" and insert -- assembly --, therefor.

Signed and Sealed this
Eighteenth Day of December, 2012

David J. Kappos
*Director of the United States Patent and Trademark Office*